United States Patent
Weber et al.

(10) Patent No.: US 10,630,152 B2
(45) Date of Patent: Apr. 21, 2020

(54) ROTOR FOR AN ASYNCHRONOUS MACHINE

(71) Applicant: Bayerische Motoren Werke Aktiengesellschaft, Munich (DE)

(72) Inventors: Korbinian Weber, Gaimersheim (DE); Uwe Deuke, Kirchheim b. Muenchen (DE); Augusto Guccione, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/138,090

(22) Filed: Sep. 21, 2018

(65) Prior Publication Data

US 2019/0020248 A1    Jan. 17, 2019

Related U.S. Application Data

(63) Continuation of application No. PCT/EP2017/055513, filed on Mar. 9, 2017.

(30) Foreign Application Priority Data

Mar. 23, 2016    (DE) .......................... 10 2016 204 782

(51) Int. Cl.
*H02K 17/16* (2006.01)
*H02K 15/00* (2006.01)
*H02K 17/20* (2006.01)

(52) U.S. Cl.
CPC ......... *H02K 15/0012* (2013.01); *H02K 17/16* (2013.01); *H02K 17/165* (2013.01); *H02K 17/20* (2013.01); *H02K 2213/03* (2013.01)

(58) Field of Classification Search
CPC .... H02K 15/00; H02K 15/0012; H02K 17/16; H02K 17/165; H02K 2213/03; H02K 17/20

(Continued)

(56) References Cited

U.S. PATENT DOCUMENTS

| 3,694,906 A | * | 10/1972 | Rank | ........................ | H02K 1/28 |
| | | | | | 29/447 |
| 4,469,970 A | * | 9/1984 | Neumann | ............ | H02K 1/2773 |
| | | | | | 310/156.78 |

(Continued)

FOREIGN PATENT DOCUMENTS

CN         1129996 C       12/2003
CN       101997369 A        3/2011

(Continued)

OTHER PUBLICATIONS

International Search Report (PCT/ISA/210) issued in PCT Application No. PCT/EP2017/055513 dated May 18, 2017 with English translation (five pages).

(Continued)

*Primary Examiner* — Naishadh N Desai
(74) *Attorney, Agent, or Firm* — Crowell & Moring LLP

(57) ABSTRACT

A rotor for an asynchronous machine includes a laminated rotor core which is made of a plurality of rotor laminations that are stacked in a longitudinal direction of the rotor, an intended rotational axis of the rotor running in the longitudinal direction; and a rotor cage that has a number of rotor bars, which run through the rotor laminations in the longitudinal direction, and at least one short circuit ring, which is arranged on a laminated rotor core end lying in the longitudinal direction such that the short circuit ring electrically connects the rotor bars together. The laminated rotor core contains at least one rotor lamination in a region at the end. This rotor lamination has a greater strength and/or a greater rigidity in a radial direction with respect to the rotational axis than the other rotor laminations.

15 Claims, 2 Drawing Sheets

(58) Field of Classification Search
USPC .................................. 310/156.78, 156.79
See application file for complete search history.

(56) References Cited

U.S. PATENT DOCUMENTS

| | | | |
|---|---|---|---|
| 5,610,465 A | 3/1997 | Sakamoto et al. | |
| 6,184,606 B1* | 2/2001 | Pyrhonen | H02K 17/165 310/182 |
| 6,515,399 B1* | 2/2003 | Lauf | H02K 5/145 310/238 |
| 6,724,119 B1 | 4/2004 | Wellisch | |
| 2005/0073216 A1* | 4/2005 | Mitcham | H02K 17/165 310/270 |
| 2011/0030419 A1* | 2/2011 | Kikuchi | F04B 35/04 62/498 |
| 2013/0062987 A1* | 3/2013 | Biesenbach | H02K 15/02 310/211 |
| 2014/0132105 A1 | 5/2014 | Kleber | |
| 2014/0368082 A1* | 12/2014 | Barton | H02K 15/165 310/216.121 |
| 2015/0054360 A1* | 2/2015 | Tanaka | C21D 6/002 310/44 |
| 2015/0372576 A1* | 12/2015 | Hembroff | H02K 17/165 310/211 |
| 2016/0079837 A1* | 3/2016 | Thumm | H02K 3/02 310/211 |

FOREIGN PATENT DOCUMENTS

| | | |
|---|---|---|
| CN | 105229897 A | 1/2016 |
| DE | 42 22 187 C1 | 8/1993 |
| DE | 198 29 053 A1 | 12/1999 |
| DE | 10 2012 214 772 A1 | 2/2014 |
| EP | 1 521 348 A2 | 4/2005 |
| JP | 9-121517 A | 5/1997 |
| WO | WO 2015/200033 A1 | 12/2015 |

OTHER PUBLICATIONS

German-language Written Opinion (PCT/ISA/237) issued in PCT Application No. PCT/EP2017/055513 dated May 18, 2017 (six pages).
German-language Search Report issued in counterpart German Application No. 10 2016 204 782.5 dated Jan. 26, 2017 with partial English translation (11 pages).
Chinese Office Action issued in Chinese counterpart application No. 201780005267.1 dated Jul. 23, 2019, with English translation (Fifteen (15) pages).

* cited by examiner

ROTOR FOR AN ASYNCHRONOUS MACHINE

CROSS REFERENCE TO RELATED APPLICATIONS

This application is a continuation of PCT International Application No. PCT/EP2017/055513, filed Mar. 9, 2017, which claims priority under 35 U.S.C. § 119 from German Patent Application No. 10 2016 204 782.5, filed Mar. 23, 2016, the entire disclosures of which are herein expressly incorporated by reference.

BACKGROUND AND SUMMARY OF THE INVENTION

The invention relates to a rotor for an asynchronous machine, and to an asynchronous machine having a rotor of this kind.

Electrical machines, such as asynchronous machines, are used as electrical drive assemblies of motor vehicles or utility vehicles, such as, for example, electric vehicles, hybrid vehicles, etc.

In said applications, there is a tendency to operate the asynchronous machines at relatively high rotation speeds with relatively low torques. In order to achieve a greater power density in this case, it is desirable to reduce the dimensions of the asynchronous machine. However, this is possible only to a limited extent for the following reasons.

Known rotors of asynchronous machines are generally constructed from a laminated core, which is arranged on a corresponding shaft of the rotor, and a cage which passes through the laminated core. The cage contains a large number of rods which pass through the laminated core and are electrically connected to one another by a short-circuiting ring at the respective end sides of the laminated core.

The laminated core is subjected to mechanical loading during operation by the centrifugal forces which occur. The centrifugal force which occurs can be described by the following equation:

$$F = m^* \omega^{2} {^*}r$$

As is clear, the centrifugal force F decreases as the overall size or the radius r of the rotor falls, but rises quadratically as the angular velocity ω increases.

In addition to the centrifugal force-dependent loading of the laminated core, temperature-related loading phenomena also occur. The cage of the rotor is generally manufactured from copper and therefore has a greater coefficient of thermal expansion than the laminated core. Consequently, the short-circuiting ring and rods of the cage expand to a greater extent than the laminated core when there is an increase in temperature during operation of the asynchronous machine.

Both the centrifugal force-dependent loading phenomena and also the temperature-related loading phenomena increase in the direction of the end sides of the laminated core and there lead to increased mechanical stresses.

The mechanical stresses which occur necessarily cause corresponding dimensioning of the webs, that is to say the region of the laminations which is located on the outside of the rods in the radial direction, and therefore limit the desirable reduction in the dimensions of the rotor and, respectively, of the asynchronous machine.

Considerations of increasing the size of the web by the cage in the laminated core being designed to be smaller radially in relation to the rotation axis fail in that less power is achieved in this way.

Expressed in general, the problem is that the maximum possible rotation speed or the maximum possible reduction in the radial dimensions of the rotor at this rotation speed is limited owing to the strength of the webs in the region of the end sides.

Approaches which increase the rotation speed of an asynchronous machine are known from document DE 102012214772 A1. This document describes a rotor for an asynchronous machine, which rotor supports a laminated core which accommodates a complete cage which is formed in a die-casting process and has rods and corresponding short-circuiting rings which connect the rods. One or more steps are formed in the transition region between the respective rotor rods and the corresponding short-circuiting ring, said steps leading to a reduction in the notch effects in the transition region and, respectively, the local stress peaks and therefore allow higher rotation speeds.

However, the strength of the web of the corresponding laminated core is not addressed in said document.

Rather, owing to the formation of the steps in the transition region between the rotor rods and the corresponding short-circuiting ring, the mass of the cage is further increased in this region, and for this reason the problems of the temperature-dependent and centrifugal force-dependent loading phenomena already explained above are not reduced in a rotor of the kind described in said document.

In this respect, there is also the problem with regard to said document that the maximum possible rotation speed or the maximum possible reduction in the radial dimensions of the rotor at said rotation speed is limited by the required strength of the webs in the region of the end sides.

Furthermore, the production costs are increased in the case of the known rotor since the individual laminations of the laminated core have to be punched differently in order to realize the steps.

Against the above background, the object of the present invention is to provide a rotor for an asynchronous machine, which rotor permits a further increase in the rotational speeds and, respectively, a reduction in the dimensions in comparison to the prior art. One objective of the invention is, at least, to provide an alternative rotor to the prior art.

The object is achieved by a rotor in accordance with embodiments of the invention.

A rotor which is constructed according to one aspect of the invention and is intended for an asynchronous machine contains a laminated rotor core and a rotor cage.

The laminated rotor core of the rotor is constructed from a large number of rotor laminations which are layered in a longitudinal direction of the rotor, an intended rotation axis of the rotor running in said longitudinal direction.

The laminated rotor core is preferably mounted or fitted on a shaft of the rotor, wherein the rotation axis runs through the shaft. When the rotor is used as intended, said rotor is inserted into a stator of an asynchronous machine and is mounted in the stator such that the rotor can rotate about the rotation axis which runs through the shaft.

The layered rotor laminations are preferably fitted to or stacked on one another. The fitting or stacking can preferably be performed by a force-fitting and/or interlocking connection, for example by so-called punch-stacking. Furthermore, the layered rotor laminations can be fitted to or stacked on one another by a cohesive connection, such as an adhesive connection for example.

The rotor cage of the stator has a large number of rotor bars, which run through the rotor laminations in the longitudinal direction, and at least one short-circuiting ring (also called shorting rings) which is arranged at an end of the laminated rotor core, which is situated in the longitudinal direction, in such a way that said short-circuiting ring electrically connects the rotor bars to one another.

The rotor laminations are preferably punched before the stacking in each case to form openings, wherein the rotor laminations are oriented during the stacking such that the resulting laminated rotor core has a large number of passages. The rotor bars are inserted into these passages and run through the laminated rotor core as a result. A short-circuiting ring which electrically connects the rotor bars to one another is arranged at least at one end of the laminated rotor core. Here, the short-circuiting ring preferably bears directly against an end side of the laminated rotor core.

The rotor bars and the short-circuiting ring can be secured to one another for example by a soldered or welded connection. As an alternative, the rotor bars and the short-circuiting ring can be drawn into the laminated rotor core in one piece in a die-casting process.

A short-circuiting ring is preferably arranged not only at the one end of the laminated rotor core, but also at the other end of the laminated rotor core, wherein, in this case, the further short-circuiting ring at the other end likewise preferably bears against a corresponding end side of the laminated rotor core.

The rotor bars and the short-circuiting ring(s) are preferably formed from copper, a copper alloy, aluminum, an aluminum alloy or a special alloy.

The laminated rotor core contains at least one rotor lamination in a region at the end, said rotor lamination having a greater strength and/or a greater rigidity in one radial direction with respect to the rotation axis than the other rotor laminations.

Owing to this inventive design of the laminated rotor core and, respectively, the arrangement of the at least one rotor lamination having the greater strength and/or greater rigidity in the region at the end of the laminated rotor core at which the short-circuiting ring is arranged, greater centrifugal forces and, respectively, the greater stresses which occur in the region, can be better absorbed at the webs.

As a result, the maximum possible rotation speed of the asynchronous machine which is equipped with the rotor can be further increased or the radial dimensions of the rotor can be further reduced given the same maximum rotation speed in comparison to the case of all of the rotor laminations having a uniform thickness in the longitudinal direction and being formed from an identical material.

In general, the performance of the asynchronous machine can be increased by the rotor according to the invention given a more compact construction. The more compact construction is accompanied by a savings in weight.

The higher strength is achieved in that the at least one rotor lamination is formed from a material with a higher strength than the other rotor laminations. During operation as intended, the laminated rotor core and the corresponding rotor laminations are subject to mechanical tensile stress mainly by the centrifugal forces which occur. In this respect, the strength is understood to mean, in particular, the tensile strength, and the rigidity is understood to mean the tensile rigidity.

In addition to the strength or as an alternative, the rigidity of the at least one rotor lamination is greater than that of the other rotor laminations.

The greater rigidity can be achieved, for example, by a greater thickness of the at least one rotor lamination in the longitudinal direction or a special geometric configuration of the at least one rotor lamination.

In this respect, the at least one rotor lamination can, for example, be formed from the same material as the other rotor laminations, wherein the corresponding rigidity of said at least one rotor lamination is increased in comparison to that of the other rotor laminations by way of its thickness or geometric configuration.

As mentioned, the at least one rotor lamination can, as an alternative or in addition, be formed from a material with a greater strength in comparison to that of the other rotor laminations.

The region at the end of the laminated rotor core deforms to a lesser extent during operation of the rotor on account of the increased strength and/or rigidity, and for this reason the air gap between the rotor and the stator can also be reduced for the purpose of saving on installation space.

The other rotor laminations are, in particular, those which are arranged in a center of the laminated rotor core in the longitudinal direction.

The rotor is preferably configured such that the region at the end has a large number of rotor laminations which have the greater strength and/or the greater rigidity.

Here, the rotor laminations of the large number of rotor laminations can be of identical or different configurations. In particular, the strengths and/or the rigidities of the large number of rotor laminations can be designed such that they are matched to a stress profile, which occurs during operation of the rotor, in the laminated rotor core.

The region at the end of the laminated rotor core preferably has, starting from the end, a length in the longitudinal direction of from 10% to 20% of a total length of the laminated rotor core.

The at least one rotor lamination or the rotor laminations of the large number of rotor laminations is/are formed from a material with a yield strength of from 550 MPa to 650 MPa.

By way of example, high-strength electrical metal sheets have yield strengths of this kind.

Materials which have balanced electrical and mechanical properties can be used in general. "Structural steels" or tool steels can also be used if the losses in the respective application vary in an acceptable range.

The at least one rotor lamination preferably has a greater rigidity owing to the at least one rotor lamination having a greater thickness in the longitudinal direction than the other rotor laminations. Here, the at least one rotor lamination preferably has a thickness of from 0.4 mm to 1 mm, particularly preferably of from 0.50 mm to 0.65 mm, in the longitudinal direction.

Furthermore, the end of the laminated rotor core is preferably formed by a spring steel sheet.

The rotor is very particularly preferably configured such that the region at the end has a large number of rotor laminations which have the greater strength and/or the greater rigidity, each of the large number of rotor laminations is formed from a material with a yield strength of greater than/equal to 550 MPa, particularly preferably of from 550 MPa to 650 MPa, and the end of the laminated rotor core is formed by a spring metal sheet, in particular a spring steel sheet.

Furthermore, the rotor laminations of the large number of rotor laminations are preferably thicker, in particular 0.4 mm to 1 mm, particularly preferably from 0.5 mm to 0.65 mm thicker, than the other rotor laminations in the longitudinal direction.

The other rotor laminations are, in particular, standardized rotor laminations which are manufactured from a material with a yield strength of approximately 380 MPa and have a thickness in the longitudinal direction of approximately 0.2 to 0.35 mm.

The rotor is further preferably configured in such a way that the rotor cage has a further short-circuiting ring which is arranged at another end of the laminated rotor core in the longitudinal direction in such a way that it electrically connects the rotor bars to one another; wherein the laminated rotor core contains at least one rotor lamination or a large number of rotor laminations in a region at the other end, said rotor lamination having a greater strength and/or a greater rigidity in a radial direction with respect to the rotation axis than the other rotor laminations which are not located either in the region at the one end nor in the region at the other end.

The above statements in respect of the configuration of the region at one end of the laminated rotor core equally apply for the configuration of the region at the other end of the laminated rotor core.

Furthermore, the invention relates to an asynchronous machine, in particular an asynchronous motor, which functions as a drive assembly, for a motor vehicle, comprising a rotor as has been described in the text above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
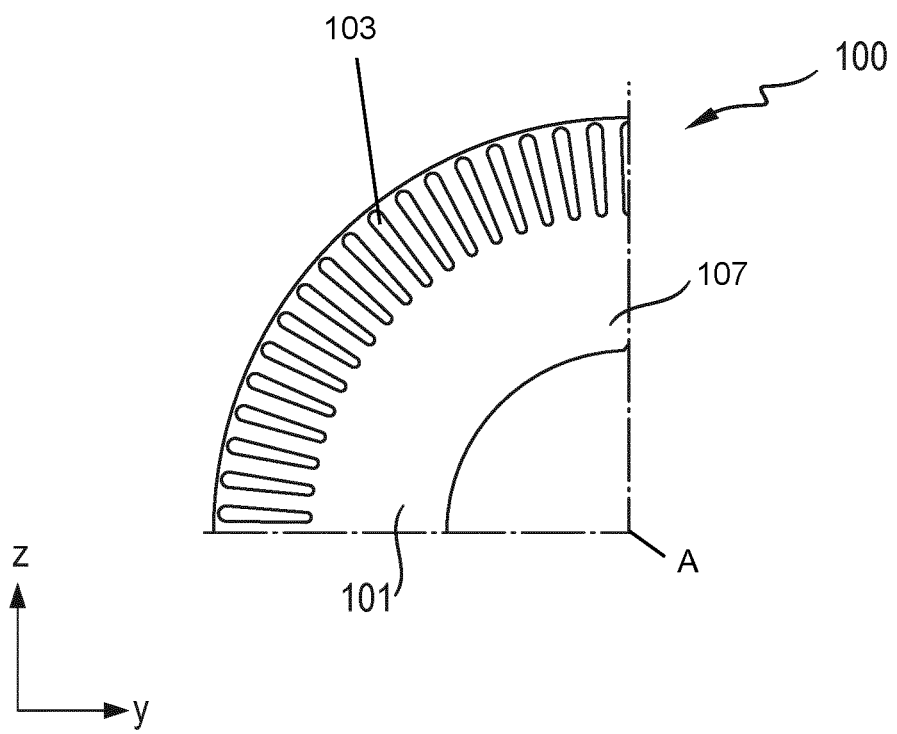
FIG. 1 is a cross section view of a rotor or its laminated rotor core, wherein only ¼ of the rotationally symmetrical laminated rotor core is shown.

FIG. 1 shows a cross section of a rotor 100 according to the invention, wherein only one laminated rotor core 101 of the rotor 100 is shown.

The rotor 100 is formed in a rotationally symmetrical manner about a rotation axis A. The rotation axis A is perpendicular to the plane of the drawing in FIG. 1 and runs in a longitudinal direction (X-direction in FIG. 1) of the rotor 100.

In accordance with its intended use, the rotor 100 according to the invention is inserted into a stator, not shown, of an asynchronous machine and is mounted in the stator such that it can rotate about the rotation axis A.

The shown Y-direction and Z-direction correspond to the width direction and, respectively, height direction of the rotor 100 according to the invention.

The laminated rotor core 101 is constructed from a large number of rotor laminations 102 which are layered in the longitudinal direction (X-direction). Each of the rotor laminations 102 has a large number of passages 103 which are oriented in relation to one another such that a large number of passages is formed through the laminated rotor core 101.

As will be further illustrated in the text which follows, rotor bars 104 of a rotor cage are inserted into each of said passages of the laminated rotor core 101. The rotor bars extend through the laminated rotor core 101 and are electrically connected to one another by way of a short-circuiting ring 105, not shown in FIG. 1, of the rotor cage at an end side 107 of the laminated rotor core 101.

After insertion of the rotor 100 into the stator of the asynchronous machine, which serves as an asynchronous motor for driving a motor vehicle in particular, the rotor is set into rotation, as is known, by a rotating magnetic field which is generated by the stator carrying along a magnetic field which is induced by eddy currents flowing in the rotor cage.

Figure 2:
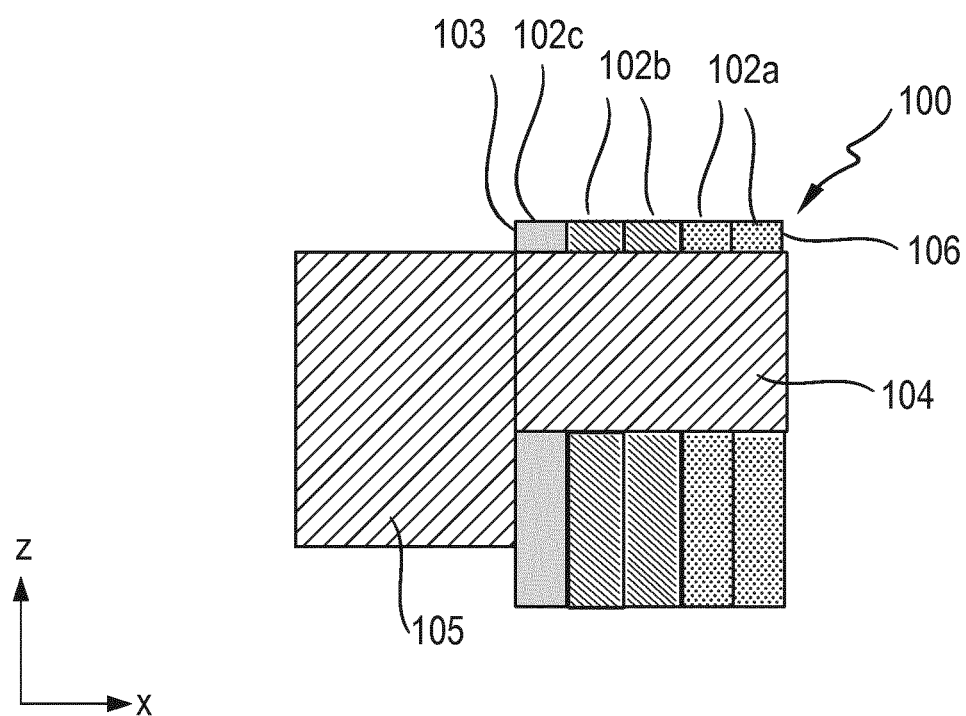
FIG. 2 schematically shows a longitudinal section of the laminated rotor core, wherein the first five rotor laminations starting from one end of the laminated rotor core are shown.

FIG. 2 shows a longitudinal section of the rotor 100 according to the invention, wherein the longitudinal section corresponds to the Z-X plane. The first five rotor laminations 102 of the laminated rotor core 101 are shown only schematically in FIG. 2.

The five rotor laminations 102 are located in a region at one end of the laminated rotor core, wherein the above-mentioned short-circuiting ring 105 bears against the end side 103 at the end of the laminated rotor core 101.

The entire laminated rotor core 101 has, overall, substantially more rotor laminations 102 than illustrated. By way of example, the entire laminated rotor core 101 can have between 800 and 1200 rotor laminations 102. The region at the end of the laminated rotor core 101 has a length in the longitudinal direction of preferably up to 20% of a total length of the laminated rotor core 101 in the longitudinal direction.

The rotor bars 104 are inserted into the passages which are formed in the laminated rotor core 101, wherein one of the rotor bars 104 is shown in section in FIG. 2.

The rotor bars 104 can preferably be electrically connected at another end, not shown in FIG. 2, of the laminated rotor core 101, likewise by a further short-circuiting ring which bears against the end side at the other end of the laminated rotor core 101.

The rotor laminations 102 shown in FIG. 2 are formed from different materials.

The rotor laminations 102a are manufactured from an electrical metal sheet which has a yield strength of approximately 380 MPa and a thickness in the longitudinal direction of approximately 0.3 mm. These rotor laminations 102a are standard rotor laminations which are known from the prior art. Rotor laminations 102a of this kind are also present in the center of the laminated rotor core 101 in the longitudinal direction and make up the majority of the rotor laminations.

In contrast, the rotor laminations 102b are formed from a material with a higher strength. By way of example, these rotor laminations are manufactured from a high-strength electrical metal sheet with a yield strength of approximately 600 MPa.

Furthermore, these rotor laminations 102b have a greater thickness than the standard rotor laminations 102a. The thickness of these rotor laminations 102b is preferably between 0.5 mm and 0.65 mm.

A rotor lamination 102c, which closes off the laminated rotor core 101, is preferably a spring steel sheet which balances, in particular, different thermal expansions of the rotor cage and of the laminated rotor core 101.

A greater strength of the laminated rotor core is achieved owing to the explained configuration of the region at the end of the laminated rotor core 101. In particular, the strength of a web 106 of the laminated rotor core 101 is increased in this way. The web 106 is the region of the rotor laminations 102 which is located on the rotor bars 104 in the radial direction outside the rotor cage.

When the rotor according to the invention rotates in the stator of the asynchronous machine, the centrifugal force F of the rotor cage, schematically shown in FIG. 2, acts on the web 106 and this leads to stress peaks in the shown region at the end of the laminated rotor core 101 on account of the short-circuiting ring 105 which is situated at the end side 103. Owing to the greater strength of the rotor laminations 102b, these stresses can be better absorbed and therefore the maximum possible rotation speed can be increased in comparison to an identical rotor which has only rotor laminations which are uniform in respect of material and thickness.

Equally, the radial dimensions of the laminated rotor core 101 can also be dimensioned to be smaller for a given rotation speed than in the case of a rotor which has only rotor laminations which are uniform in respect of material and thickness.

Furthermore, the production costs do not increase in the case of the rotor according to the invention either since the rotor laminations 102 preferably do not have to be punched in different ways in order to form the passages.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for an asynchronous machine, comprising:
a laminated rotor core which is constructed from a plurality of rotor laminations, which rotor laminations are layered in a longitudinal direction of the rotor, an intended rotation axis of the rotor extending in said longitudinal direction; and
a rotor cage having a plurality of rotor bars, which rotor bars extend through the plurality of rotor laminations in the longitudinal direction, and at least one short-circuiting ring arranged at an end of the laminated rotor core, which short-circuiting ring is situated in the longitudinal direction, such that said short-circuiting ring electrically connects the rotor bars to one another;
wherein the plurality of rotor laminations includes at least one rotor lamination, in a region at the end and abutting the end of the rotor core, and at least one other rotor lamination, said at least one rotor lamination having a greater strength and/or a greater rigidity in one radial direction with respect to the rotation axis than the at least one other rotor lamination.

2. The rotor as claimed in claim 1, wherein the region at the end has two or more rotor laminations which have the greater strength and/or the greater rigidity.

3. The rotor as claimed in claim 1, wherein the region at the end of the laminated rotor core has, starting from the end, a length in the longitudinal direction of from 10% to 20% of a total length of the laminated rotor core.

4. The rotor as claimed in claim 1, wherein the at least one rotor lamination is formed from a material with a yield strength of greater than/equal to 550 MPa.

5. The rotor as claimed in claim 4, wherein the yield strength is from 550 MPa to 650 MPa.

6. The rotor as claimed in claim 1, wherein the at least one rotor lamination has a greater rigidity owing to the at least one rotor lamination having a greater thickness in the longitudinal direction than the at least one other rotor lamination.

7. The rotor as claimed in claim 6, wherein the at least one rotor lamination has a thickness of from 0.4 mm to 1 mm in the longitudinal direction.

8. The rotor as claimed in claim 7, wherein the thickness is from 0.50 mm to 0.65 mm in the longitudinal direction.

9. The rotor as claimed in claim 4, wherein the at least one rotor lamination has a thickness of from 0.4 mm to 1 mm in the longitudinal direction.

10. The rotor as claimed in claim 1, wherein the end of the laminated rotor core is formed by a spring steel sheet.

11. The rotor as claimed in claim 1, wherein
the region at the end has a two or more rotor laminations which have the greater strength and/or the greater rigidity,
each of the two or more rotor laminations is formed from a material with a yield strength of greater than/equal to 550 MPa, and
the end of the laminated rotor core is formed by a spring steel sheet.

12. The rotor as claimed in claim 11, wherein the yield strength is from 550 MPa to 650 MPa.

13. The rotor as claimed in claim 1, wherein
the rotor cage has a further short-circuiting ring which is arranged at another end of the laminated rotor core in the longitudinal direction such that it electrically connects the rotor bars to one another, and
the laminated rotor core contains at least one further rotor lamination in a region at the other end, said at least one further rotor lamination having a greater strength and/or a greater rigidity in a radial direction with respect to the rotation axis than the at least one other rotor lamination, which at least one other rotor lamination is not located either in the region at the one end or in the region at the other end.

14. An asynchronous machine, comprising a rotor as claimed in claim 1.

15. The asynchronous machine as claimed in claim 14, wherein the asynchronous machine is a motor vehicle asynchronous machine.

* * * * *